(12) United States Patent
Craft et al.

(10) Patent No.: US 6,547,348 B2
(45) Date of Patent: Apr. 15, 2003

(54) INTERLOCKING TRIM PLATES

(75) Inventors: Hamon Leroy Craft, Plainville, CT (US); Michael Paul Lafond, Wallingford, CT (US); Robert Lee Hilgendorf, Cypress, TX (US)

(73) Assignee: General Electric Company, Schenectady, NY (US)

( * ) Notice: Subject to any disclaimer, the term of this patent is extended or adjusted under 35 U.S.C. 154(b) by 47 days.

(21) Appl. No.: 09/747,149

(22) Filed: Dec. 22, 2000

(65) Prior Publication Data

US 2002/0079793 A1 Jun. 27, 2002

(51) Int. Cl.[7] .............................................. A47B 47/00
(52) U.S. Cl. .................. 312/263; 312/265.5; 312/223.1
(58) Field of Search ........................ 312/223.1, 223.2, 312/263, 265.5, 265.6, 257.1; 174/50, 52.6; 361/624, 627, 796, 797, 798, 799, 800, 801, 802

(56) References Cited

U.S. PATENT DOCUMENTS

| | | | | |
|---|---|---|---|---|
| 3,065,038 A | * | 11/1962 | Pipe | 312/263 |
| 3,274,451 A | * | 9/1966 | Laity | 312/265.5 X |
| 3,777,224 A | | 12/1973 | Meacham | |
| 3,808,509 A | | 4/1974 | Frazier | |
| 3,946,283 A | * | 3/1976 | Meacham et al. | 361/647 |
| 4,077,686 A | * | 3/1978 | Bukaitz | 312/265.5 |
| 4,265,500 A | * | 5/1981 | Berton et al. | 312/263 X |
| 4,683,517 A | * | 7/1987 | Yazvac | 361/647 |
| 4,945,450 A | * | 7/1990 | Sabatella et al. | 361/624 |
| 5,748,442 A | * | 5/1998 | Toor | 361/685 |
| 5,761,026 A | | 6/1998 | Robinson et al. | |
| 5,810,459 A | * | 9/1998 | Barrett et al. | 312/265.5 X |
| 6,102,501 A | * | 8/2000 | Chen et al. | 312/265.6 X |
| 6,313,980 B1 | * | 11/2001 | Craft et al. | 361/627 |

FOREIGN PATENT DOCUMENTS

| | | | | |
|---|---|---|---|---|
| EP | 0441271 | * | 8/1991 | |
| JP | 04129505 | * | 4/1992 | 312/223.1 |

* cited by examiner

Primary Examiner—Lanna Mai
Assistant Examiner—Hanh V. Tran
(74) Attorney, Agent, or Firm—Cantor Colburn LLP

(57) ABSTRACT

An electrical enclosure includes gap-free trim plate installation. A switchboard or power panel includes an enclosure face with a central opening covered by a top label plate, a bottom label plate and a plurality of trim plates. The trim plate flanges cooperatively engage one another in an interlocking fashion. The interlocking arrangement allows the trim plates to remain in their installed position without external restraint during installation and removal.

44 Claims, 9 Drawing Sheets

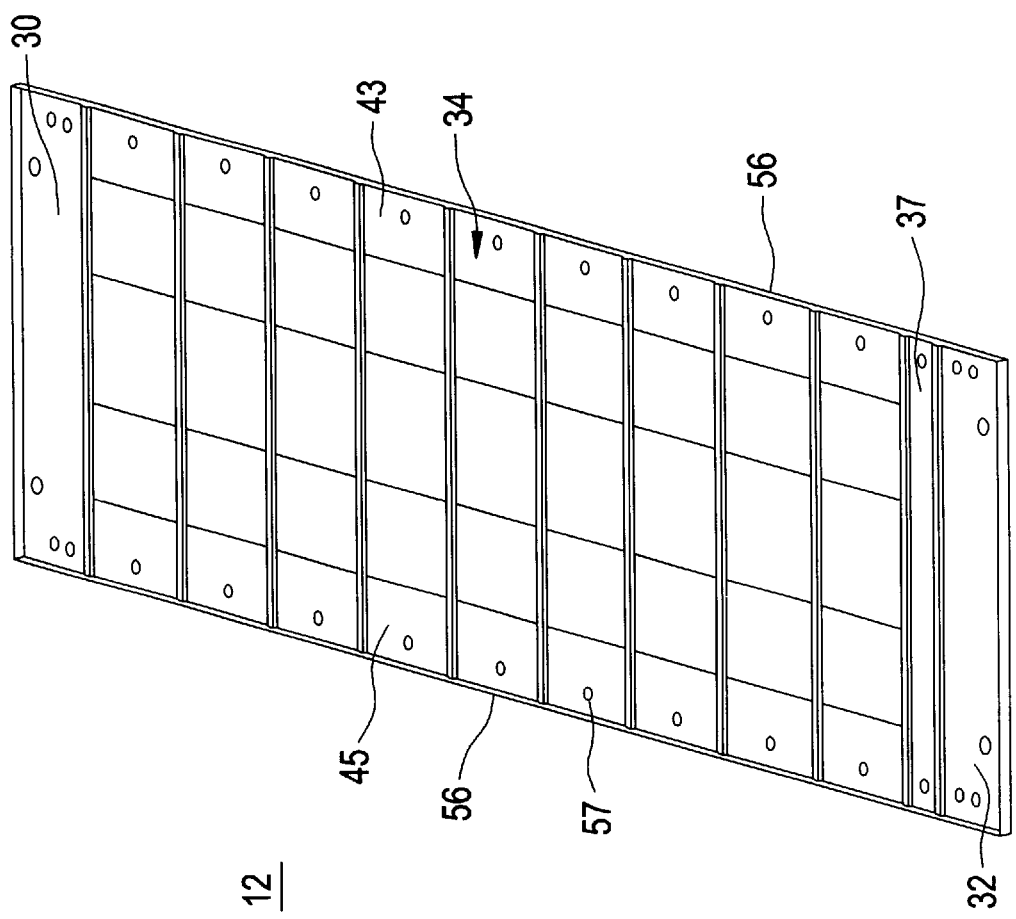

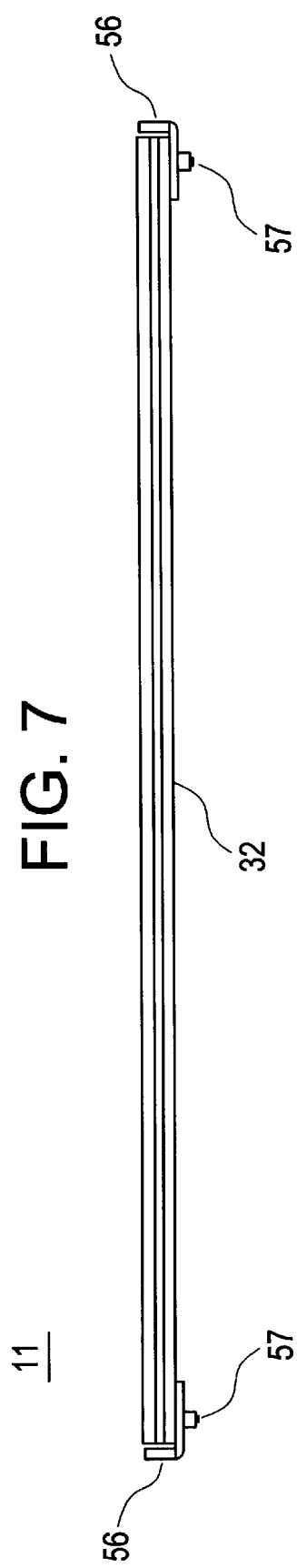

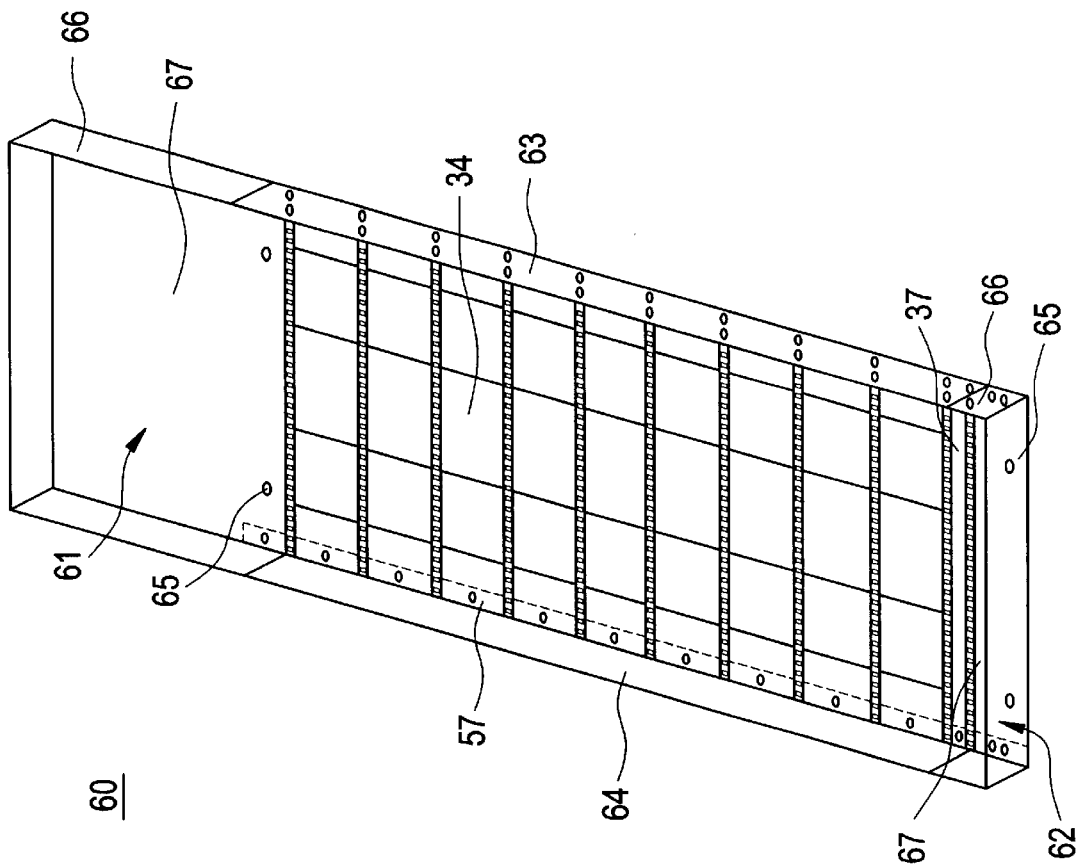

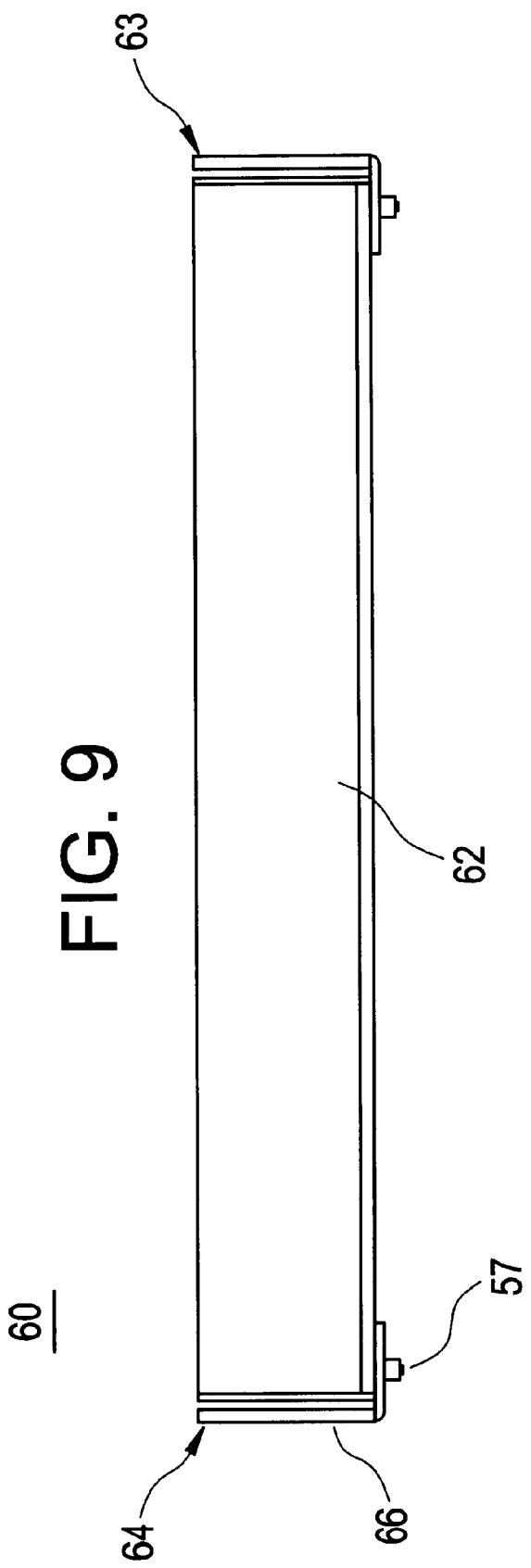

INTERLOCKING TRIM PLATES

TECHNICAL FIELD

The invention relates generally to electrical panelboards and, in particular, power panels and switchboards. The invention further relates to trim plates used with power panels and switchboards, and the removal of multiple trim plates for group mounted power panels and switchboards.

BACKGROUND OF THE INVENTION

Electrical panelboards are enclosures used in electrical distribution systems to provide a common distribution and protection point for electrical circuits. Panelboards can include electrical distribution components such as switches, metering, instrumentation, protective devices and the like. Panelboards are installed in industrial, commercial and residential facilities. Panelboards vary in their size and electrical rating depending upon the specific application. Manufacturer's design considerations include ease of manufacture, ease of use and compliance with Underwriters Laboratory ("UL") standards.

Generally, a power circuit input is connected to at least one common power bus within the panelboard via a switch, circuit breaker or lugs located within the panelboard. Electrical branch circuits are connected to the power bus via circuit breakers or other protective devices. Wiring interconnects the branch circuit protective devices to at least one remote electrical load.

Switchboard and power panels are two types of electrical panelboards. Generally, modern switchboards are identified by the characteristics of: a high amperage rating of between 200 Amps to 2000 Amps; floor mounting; a wide range of electrical distribution components capable of being installed within the switchboard; and interior accessibility from any one of the four sides, front, rear, left, or right. Generally, power panels are characterized by features including: a lower maximum ampacity; smaller physical size; wall mounting; and only front access to the interior.

UL standards provide equipment design criteria that insure the safe operation of electrical panelboards. The standards reduce the shock hazard posed to operating personnel and the likelihood of equipment failure. UL standards restrict the size of external openings located in fully assembled power panels and switchboards. Specifically, UL Standard No. 67 ("UL 67") restricts the dimension to 0.125 inches.

The front of a four-piece front style switchboard or power panel includes two side plates, a top plate and a bottom plate. A central opening is formed between the four plates. Multiple trim plates span central opening of the power panel or switchboard and prevent accidental contact with energized components within the switchboard or power panel. The trim plate edges abut the edge of the adjacent trim plates. However, a gap is created at each abutment.

Today, manufacturers comply with UL 67 using more difficult and costly designs and manufacturing methods. First, closer manufacturing tolerances must be maintained to avoid gaps larger than allowed by UL 67. Second, the power panel or switchboard design must insure that any gap adjustments occurring during shipping and installation do not result in a violation of UL 67.

Modern trim plates are secured to the switchboard or power panel via fasteners and plastic clips. The clips are not durable and have a tendency to break when trim plates are installed or removed. Also, trim plate removal is difficult because trim plates must be held in place when being installed or removed. Otherwise, the trim plate will drop to the ground with all of the fasteners removed.

Finally, the four piece front style switchboards and power panels present additional problems in removing and installing trim plates. State of the art designs require that the side plates of the switchboard or power panel be removed any time a trim plate is removed or installed. Side plate removal is time consuming and reduces personnel safety because internal panelboard wiring is exposed when the side plates are removed.

Electrical enclosures also use a dead-front style wherein the dead front is constructed from a top, a bottom and two sidewalls. A dead-front electrical panelboard includes a central opening between sidewall flanges similar to the opening found in a four-piece front style panelboard. Trim plates are used to span the central opening formed between the flanges of a dead front power panel or switchboard. The dead front does not fully span the front opening of the body. Instead a hinged door with integral flanges is secured to the dead front. The combination door and dead-front are secured to the front of the electrical enclosure. The door flanges cover the space between the outer edge of the dead front and the outer edge of the electrical enclosure. The trim plates used in modern dead front style switchboards and power panels suffer from the preceding problems described for four-piece front style switchboards and panelboards.

SUMMARY OF THE INVENTION

It is therefore advantageous to design an electrical enclosure that includes trim plates providing a gap-free installation. It is also desirable to incorporate the preceding feature in a more rigid trim plate installation. Further, it is desirable to incorporate the preceding features in trim panel design that eliminates the need to grasp the trim panel when removing and installing the mounting fasteners. Additional benefits are provided by an electrical enclosure designed to allow individual trim panel removal without the need to remove other enclosure plates or panels. Further, it is desirable to provide a enclosure design that allows group removal of all trim panels. Additionally, it is desirable to design an electrical panelboard, in particular a switchboard or power panel, incorporating the preceding features. According to the present invention, an electrical enclosure including an enclosure body and a plurality of trim plates with a first flange having a first flange shape cooperatively engaging a second flange having a second flange shape providing a gap free installation attains the foregoing and other objects and advantages.

Additionally, a method of gap-free trim plate installation requiring no external restraint during installation is provided. The method uses the interlocking trim panel flanges to restrain the trim panel while the trim panel mounting fasteners are installed.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of instrumentalities and combinations particularly pointed out in the appended claims.

BRIEF DESCRIPTION OF THE DRAWINGS

FIG. 6 is an isometric view of the cover assembly of FIG. 1;

FIG. 7 is a bottom view of the cover assembly of FIG. 6;

FIG. 8 is an isometric view of a second embodiment of the invention used with dead-front style electrical enclosures; and FIG. 9 is a side view of the embodiment of FIG. 8.

DESCRIPTION OF THE PREFERRED EMBODIMENT

Figure 1:
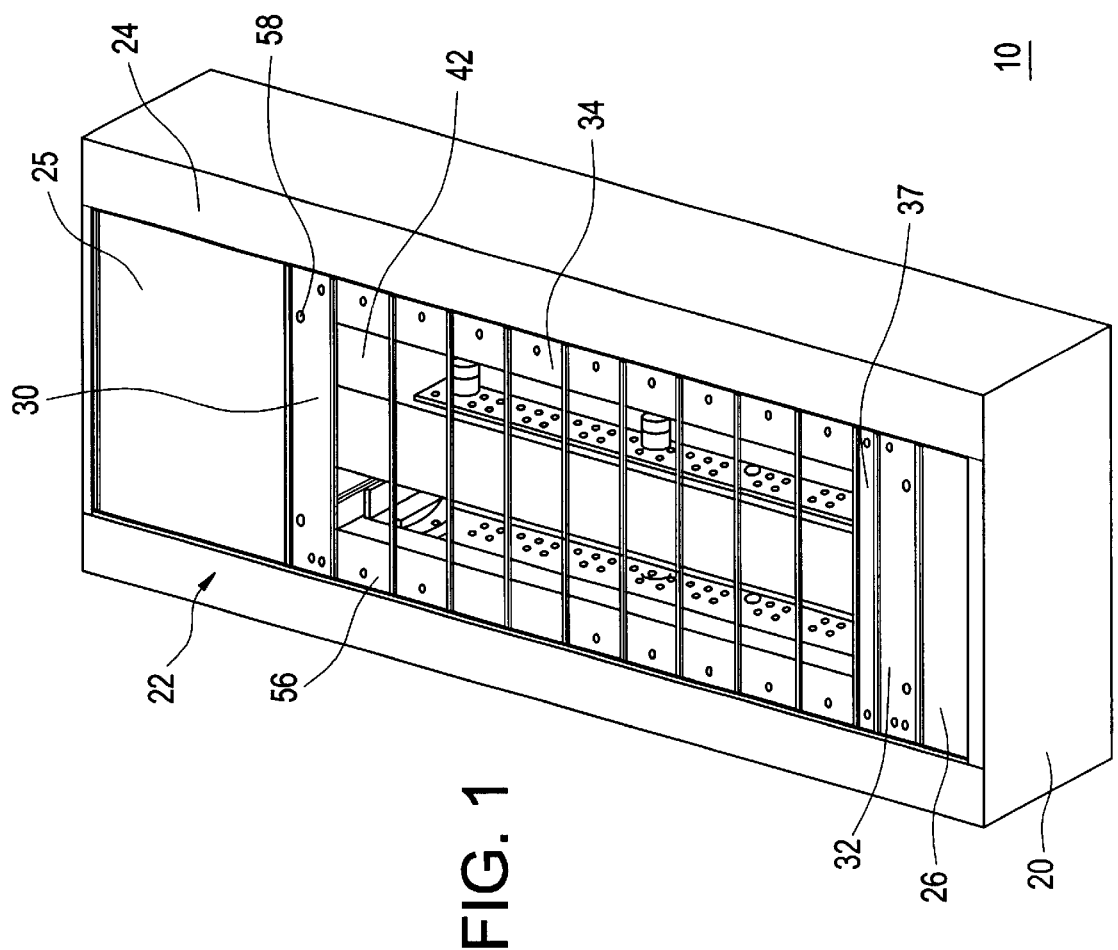
FIG. 1 is an isometric view of an electrical enclosure according to a first embodiment of the invention.

Referring to FIG. 1, a preferred embodiment of an electrical enclosure 10 in the form of a power panel or switchboard is shown. The enclosure body 20 houses electrical distribution components (not shown) such as circuit breakers, switches, transient voltage suppressors, metering, instrumentation and the like. The electrical distribution components are connected to the power busses 42 that are also housed within the enclosure 10.

Generally, external electrical circuits (not shown) enter the sides, top or bottom of the electrical enclosure 10. Branch circuits are connected to the power busses via the electrical distribution components. Typically, a circuit breaker or switch provides a shutoff point for the branch circuits. Often, a main circuit breaker or disconnect switch is included to provide a common shutoff point for all the branch circuits supplied from the electrical enclosure 10.

The incoming power supply circuit is directly connected to the main power bus via main lugs when a circuit breaker or switch is not used. Usually, main lugs are either mechanical lugs, wherein the wire is terminated via a set screw or jaws that are hand tightened, or compression lugs, wherein the hollow body of the lug is pressed into engagement with the wire using a crimping tool.

The enclosure face 22, of FIG. 1, incldes side plates 24, a top plate 25, and a bottom plate 26 installed along the outer edge of the enclosure body 20. This style electrical enclosure 10 is referred to as a four-piece front. The central opening (not shown) formed between the side plates 24, top plate 25, and bottom plate 26 is covered by a plurality of trim plates 34 and top and bottom label plates 30, 32.

The trim plates 34 are required to provide a barrier between operating personnel and energized electrical components located in the enclosure body 20. UL 67 describes the maximum gap allowed between trim plates 34. The Standard's primary objective is to reduce the risk of foreign objects entering the electrical enclosure 10 and contacting energized components.

Figure 2:
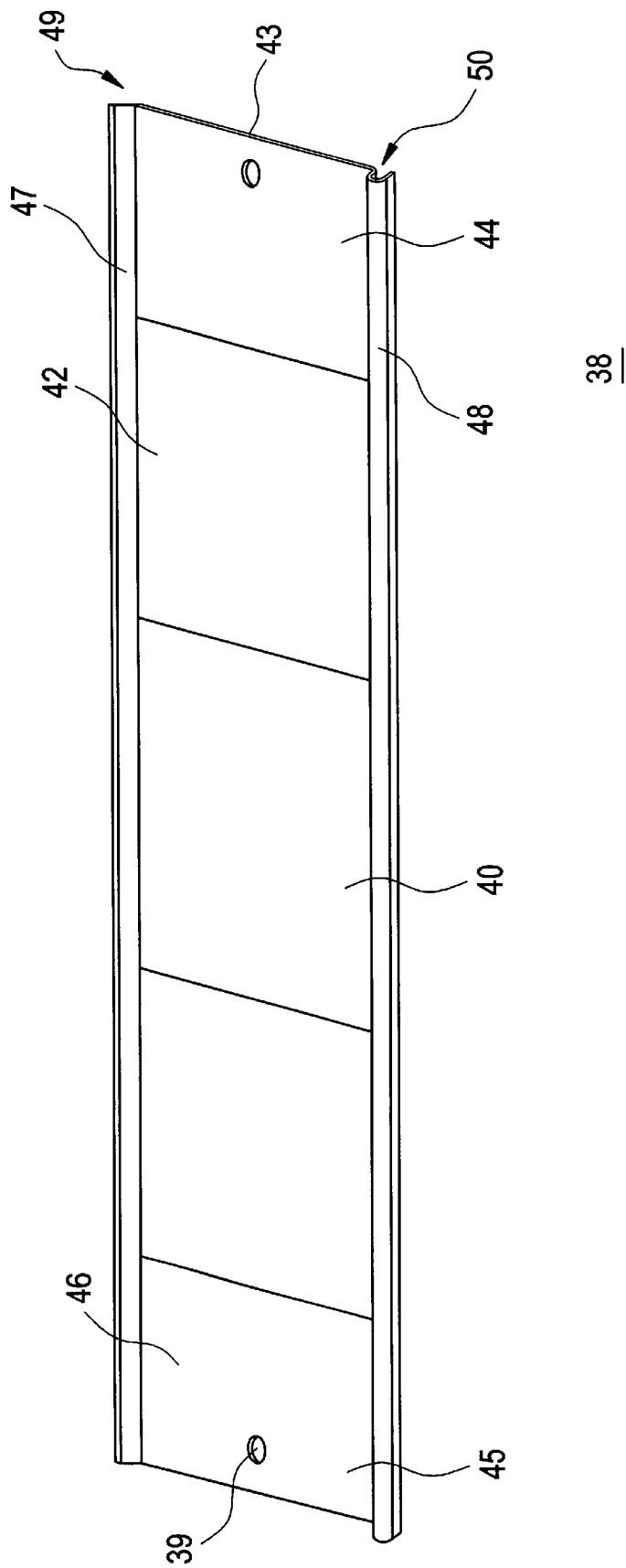
FIG. 2 is an isometric view of a breaker cover of FIG. 1.

The trim plates 34, also referred to as cover plates, are supplied in a number of configurations including filler plates 37, breaker covers 38 FIG. 2 and the like. The breaker cover 38 of FIG. 2 includes a substantially planar center panel 40, at least one cutout 42 a first end panel 44 and a second end panel 46. The cutouts 42 allow the electrical distribution component operating handles to extend beyond the enclosure face 22 where the component can be safely operated with the breaker cover 38 installed. A breaker cover is identified by the existence of cutouts 42 in this style trim plate. The breaker cover 42 in FIG. 2 is a dual mounted breaker cover. However, the exact size and location of the cutouts 42 can vary with the application. The number of cutouts in a breaker cover 38 should match the number of electrical distribution components mounted in the section of the electrical enclosure where the breaker cover 38 is installed. This insures that each electrical distribution component can be accessed externally while preventing any access inside the enclosure. For example, a single mounted breaker configuration will include a single cutout centrally located in the breaker cover 38. Multiple breaker configurations may include six or more individual cutouts Filler plates 37 have a solid front that does not include any cutouts. Filler plates 37 include a substantially planar center panel that is continuous for the whole width of the trim plate between a trim plate first end 43 and a trim plate second end 45. Filler plates 37 are used to completely cover sections of the central opening that do not house electrical distribution components requiring external access.

The height Z of trim plates 34 may vary depending upon the application and the portion of the central opening being covered. Generally, Z is a multiple of a standard height. For example, the height of a single circuit breaker can be used as the standard height X. In that case, all the trim plate heights Z will be expressed in multiples of X. The height Z of any single trim plate is customized for the application and the amount of space it is intended to fill. All trim plates used in a single electrical enclosure will have the same width because they span between the same two parallel mounting flanges. Trim plate widths may vary between different size enclosures.

Typically, trim plates are manufactured from steel because it provides the advantages of relatively low cost and the desired strength to weight ratio. Trim plate mounting holes 39 are located at the trim plate first end 43 and the trim plate second end 45. Mounting hardware such as screws, bolts and the like is used to secure the trim plates 34 to the electrical enclosure 10 via trim plate mounting holes 39.

Figure 3:
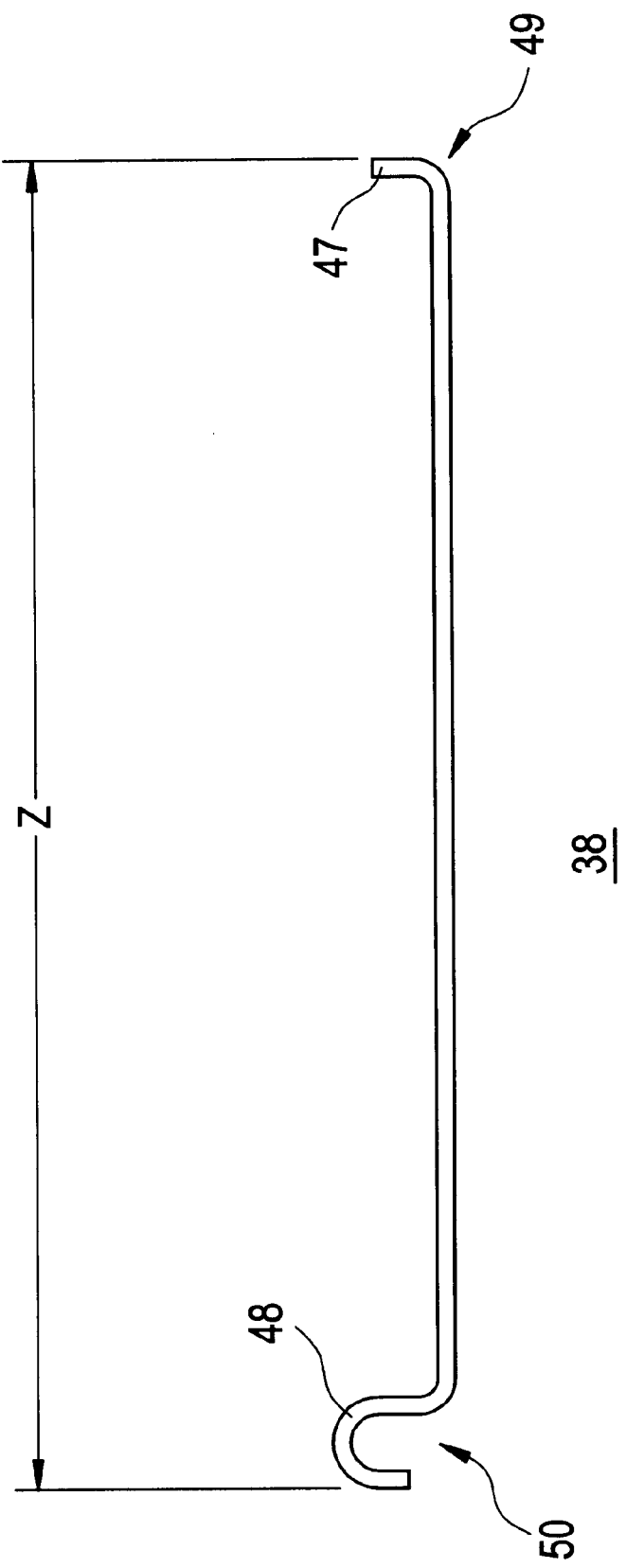
FIG. 3 is a side view of the breaker cover of FIG. 2.

FIG. 3 clearly shows the breaker cover 38 first flange 47 having a first flange shape formed along the first edge 49 and second flange 48 having a second flange shape formed along the second edge 50. In a preferred embodiment shown in FIG. 3 the first flange shape is a ninety-degree outward facing bend. The bend is outward facing because it faces away from the enclosure body 20 when the breaker cover 38 is installed. Additionally, FIG. 3 shows the second flange shape as an inward facing U. A wide variety of geometric shapes may be used such as a V-shaped second flange shape, an inward facing U shaped first flange shape and the like so long as they provide the cooperative engagement of adjacent trim plates as described herein.

Figure 4:
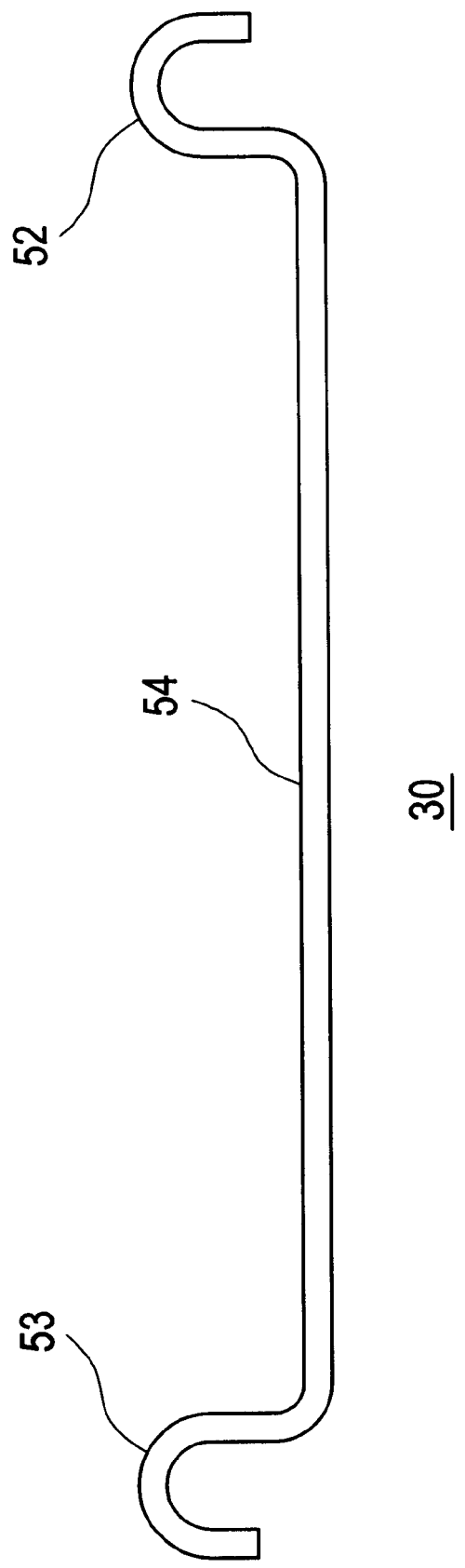
FIG. 4 is a side view of the top label plate of FIG. 1.

A top label plate 30, FIG. 1, is used above a group of one or more trim plates 34. FIG. 4 shows the details of a preferred embodiment of the top label plate 30. The top label plate 30 includes identical top label plate flanges 52, 53 and a solid top label plate face 54 similar to the filler plate. The electrical panelboard nameplate is affixed to the exterior of the top label plate face 54. The top label plate flanges 52, 53 include identically shaped inward facing U-shapes. The identically shaped flanges are preferred in this application because each top label plate flange 52 or 53 cooperatively engages a similarly shaped flange when installed. One flange 52 cooperatively engages the bottom flange of the top plate 25. The second flange 53 cooperatively engages the top flange of an adjacent trim plate 34. The inward facing U-shaped flange shape also eliminates an exposed sharp edge and provides a gap-free installation. The term gap-free is used to describe an installation that includes no gaps where trim plates abut an adjacent trim plate, plate, panel, cover or flange. The gap-free installation is the result of the overlap between each trim plate 34 and the adjacent trim plates, plates, covers and flanges.

However, the bottom label plate 32, FIG. 1, located below the lowest of trim plates 34 includes flange shapes identical to the flange shapes of trim plates 34. The bottom label plate 32 uses this style flange shape because its top edge cooperatively engages an adjacent trim plate 34.

Figure 5:
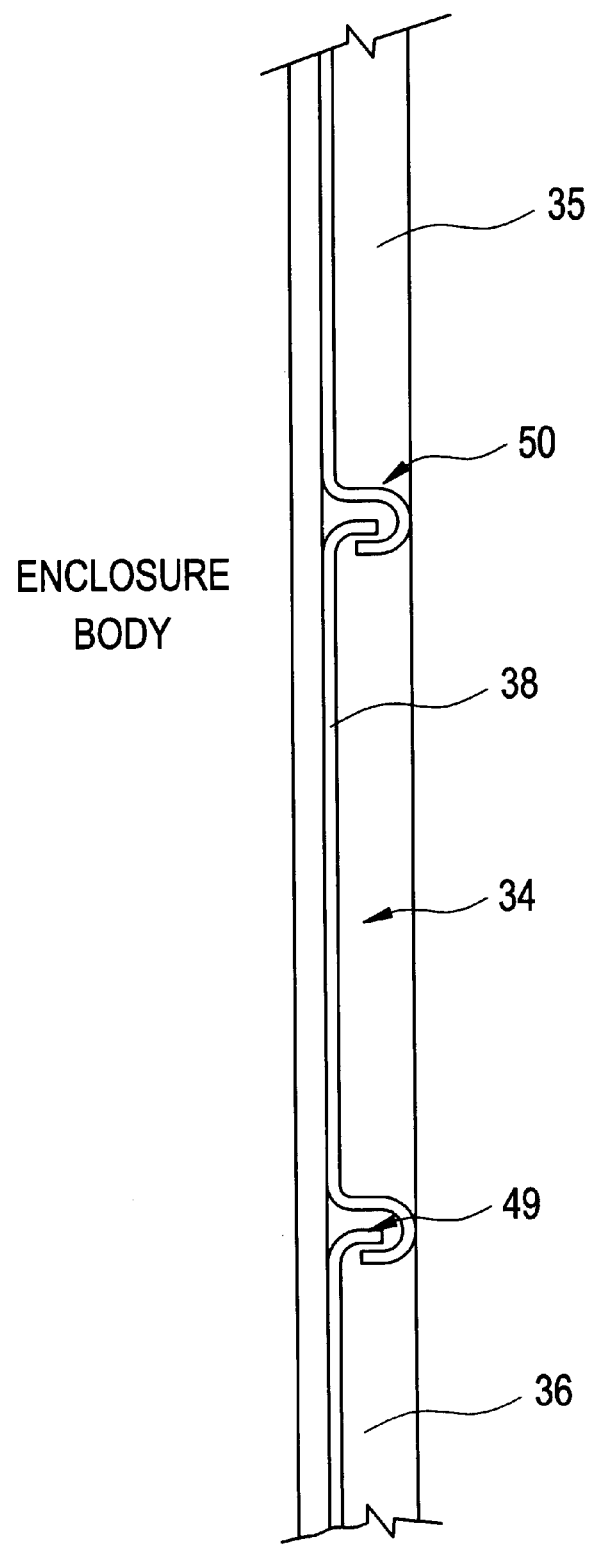
FIG. 5 is a side view of installed trim plates.

FIG. 5 demonstrates the cooperative engagement of adjacent trim plates 34. The first edge 49 of breaker cover 38 is captured by the second edge 50 of a first adjacent trim plate 35. The first adjacent trim plate 35 is located above the trim plate 34 in a preferred embodiment. The second edge 50 of trim plate 34 captures the first edge 49 of a second adjacent trim plate 36 located below the trim plate 34. Both the second edge 50 of a first adjacent trim panel and the first edge 49 of breaker cover 38 provide an overlap between adjacent trim plates 34. Additionally, an interlocking trim plate arrangement results from the cooperative engagement. The cooperative engagement of adjacent trim plates provides a gap-free cover over the central opening in compliance with applicable UL standards. Ordinary trim plate deflection either inward or outward will not create a gap because of the overlapping engagement of the first edge 49 and second edge 50 of adjacent trim plates 34. The interlocking arrangement of the plurality of trim plates 34, FIG. 1, and the ribbed construction provided by the second flange 48 of each trim plate reduce the flexibility of the solid barrier created by the trim plates 34, thus improving the protection provided by the trim plates 34. The interlocking arrangement provides additional benefits during installation and service that are described in more detail herein.

FIG. 6 shows a cover assembly 12 comprised of cover collectors 56, a top label plate 30, a bottom label plate 32, and a plurality of trim plates 34. The assembly is formed by securing the trim plate first end panel 43 and second end panel 45 to cover collectors 56, and either end of the top label plate 30 and bottom label plate 32 to cover collectors 56. In a preferred embodiment the trim plates 34 and label plates 30, 32 are secured via plate fasteners 57. Additionally, the fasteners 57 are self-tapping in a preferred embodiment.

The first end panel 43 and second end panel 45 overlap the mounting flange (not shown) of the cover collector 56 where they are secured. This overlap combined with the cooperative engagement of trim plates 34 provides a gap-free installation of trim plate 34.

The cover assembly 12 can be secured to the enclosure face 22, FIG. 1, as a single piece. In a preferred embodiment the cover assembly 12 is secured to the enclosure face by four cover assembly fasteners 58. FIG. 7 provides a detailed profile of the cover assembly 12 viewed from the bottom of the cover assembly 12.

The cover assembly 12 eliminates the tedious and time-consuming removal of individual trim plates 34 in order to access the enclosure interior. The ability to effectively remove a plurality of trim plates 34 is especially important during installation because the enclosure 10 is shipped fully assembled to the installation site. The electrical installers must access the interior of the enclosure in order to install and terminate the field wiring. The invention facilitates the installation process by allowing group trim plate removal.

In operation, trim plates 34 are individually removed from the electrical enclosure 10 by removing single plate fasteners 57 located near the trim plate first end 43 and trim plate second end 45. The interlocking arrangement of trim plates 34 eliminates the need to restrain the trim plate 34 when the plate fasteners 57 are removed. The trim plate will remain in the installed position because the trim plate first flange 47 is interlocked with the second flange 48 of the first adjacent trim panel 35 and the trim plate second flange 48 is interlocked with the first flange 47 of the second adjacent trim panel 36.

Removal is completed by grasping the second edge 50 of the trim plate 34 and pulling it away from the enclosure body 20 so that the trim plate first flange 47 acts as a hinge for the trim plate 34. The trim plate first flange 47 is then disengaged from the second flange 48 of the first adjacent trim plate 35 and the trim plate is withdrawn from the electrical enclosure 10. Thus, the fact that trim plates 34 are hingedly coupled to one another provides the foregoing advantages of ease of installation and removal.

The trim plate 34 is installed in a similar fashion. The trim plate first flange 47 is placed behind the second flange 48 of the first adjacent trim panel 35 while the second flange 48 is held a slight distance away from the enclosure body 22. The trim plate 34 is then pivoted toward the enclosure body 22 so that the trim plate second flange 48 engages the first flange 47 of the second adjacent trim panel 36. The plate fasteners 57 are then installed to fix the trim plate 34 in place. Thus, external restraint need not be applied to trim plate 34 while the plate fasteners 57 are being installed. Generally, external restraint is provided by the individual performing the installation or removal by their applying pressure to the trim plate 34 or grasping the trim plate 34.

The cover assembly 12 is removed from the electrical enclosure 10 by removing four cover assembly fasteners 58 and withdrawing the entire assembly including cover collectors 56, the plurality of trim plates 34, top label plate 30, and bottom label plate 32 from the enclosure 10. Where electrical distribution components such as circuit breakers are installed in the electrical enclosure 10 the cover assembly 12 must be withdrawn directly away from the enclosure 10 a sufficient distance to clear the component operating handles before being set aside. The central opening is exposed with the cover assembly 12 removed allowing clear access to the interior of the enclosure body 20. The cover assembly 12 is easily reinstalled by aligning it back over the central opening and securing it to the electrical enclosure 10 via cover assembly fasteners 58.

Referring to FIG. 8 an alternate embodiment, referred to as a dead front assembly 60, is shown. The dead front assembly 60 includes a dead front top 61 and a dead front bottom 62 connected to one another by a dead front first side 63 and a dead front second side 64. Both the dead front top 61 and dead front bottom 62 have sidewalls 66 located on three sides of base 67 perpendicular to the base 67. Mounting hardware (not shown) is inserted in dead front mounting holes 65 to secure the dead front assembly 60 to the electrical enclosure 10. A plurality of trim plates 34 span the opening formed between the dead front top 61, dead front bottom 62, dead front first side 63 and dead front second side 64 when these components are assembled.

The dead front first and second sides 63, 64 are L-shaped as shown in FIG. 9. The long side of the L creates a sidewall 66 when installed in the dead front assembly 60 while the short side of the L provides a mounting flange for attaching the dead front top 61, dead front bottom 62 and plurality of trim plates 34. The dead front top 61, dead front bottom 62 and trim plates 34 are attached to the dead front sides 63, 64 by plate fasteners 57.

In a further embodiment of the invention cooperatively engaging cover plates (not shown) can be used to protect openings in enclosures for telecommunications and computer equipment. The cover plates include flange construction identical to that previously described for the trim plates 34. These identical features include the first flange shape and the second flange shape. The identical features provide the cover plate with advantages similar to those provided by the trim plates. The advantages include the overall cooperative engagement between adjacent flanges, overlapping, hinged coupling and the like.

In telecommunications and computer applications the cover plates may include a solid front. Alternatively, the cover plates for these applications may include equipment openings that allow access to computer or telecommunications equipment located within the enclosure. The cover plates may be manufactured out of either metal or plastic as required for the application.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A trim plate providing a gap-free installation with at least one adjacent trim plate in a switchboard, power panel or telecommunications enclosure, comprising:
   a substantially planar center panel;
   a trim plate first flange having a first flange shape configured to cooperatively engage a second flange of a first adjacent trim plate; and
   a trim plate second flange having a second flange shape configured to cooperatively engage a first flange of a second adjacent trim plate,
   wherein at least one of said trim plate first flange and said trim plate second flange extends a length defining a length of said center panel, one end of said trim plate is free to pivot about an opposite end of said trim plate for removal and installation of said trim plate disposed between said first and second adjacent trim plates.

2. The trim plate as described in claim 1, wherein the cooperative engagement provides an overlap between adjacent trim plates eliminating a potential gap between said adjacent trim plates.

3. The trim plate as described in claim 2, wherein said trim plate first flange shape and trim plate second flange shape interlock said trim plate with said first adjacent trim plate and said second adjacent trim plate.

4. The trim plate as claimed in claim 3, wherein said trim plate first flange shape and said trim plate second flange shape are configured to allow said trim plate to be hingedly coupled with said first and second adjacent trim plates.

5. The trim plate as claimed in claim 4, wherein interlock of said trim plate with said first adjacent trim plate and said second adjacent trim plate allow said trim plate to remain in an installation position without the use of fasteners or external restraints.

6. The trim plate as claimed in claim 5, wherein said first flange shape and said second flange shape are dissimilar.

7. The trim plate as claimed in claim 6, wherein said first flange is formed as a ninety degree bend along a first edge of said trim plate.

8. The trim plate as claimed in claim 7, wherein said second flange is formed as a U-shape along a second edge of said trim plate.

9. The trim plate as claimed in claim 8, wherein said ninety degree bend faces outward.

10. The trim plate as claimed in claim 9, wherein said U-shape faces inward.

11. The trim plate as claimed in claim 10, wherein said planar center panel extends a width of said trim plate between a trim plate first end and a trim plate second end.

12. The trim panel as claimed in claim 11, wherein said trim plate is a filler plate.

13. The trim plate as claimed in claim 11, wherein said planar panel includes at least one cutout.

14. The trim plate as claimed in claim 13, wherein said trim plate is a breaker cover.

15. An enclosure for electrical or telecommunications equipment providing a gap-free trim plate installation, comprising:
    an enclosure body; and
    a plurality of trim plates, wherein each trim plate of said plurality of trim plates includes:
      a substantially planar center panel,
      a trim plate first flange having a first flange shape configured to cooperatively engage a second flange of a first adjacent trim plate, and
      a trim plate second flange having a second flange shape configured to cooperatively engage a first flange of a second adjacent trim plate, at least one of said trim plate first flange and said trim plate second flange extends a length defining a length of said center panel, one end of said trim plate is free to pivot about an opposite end of said trim plate for removal and installation of said trim plate disposed between said first and second adjacent trim plates.

16. The enclosure as described in claim 15, wherein said first flange shape and second flange shape interlock said trim plates with one another when installed in said enclosure.

17. The enclosure as claimed in claim 16, wherein said first flange shape and said second flange shape are configured to allow said trim plates to be hingedly coupled with one another.

18. The enclosure as claimed in claim 17, wherein a cooperative engagement of said first flange and said second flange allows said trim plates to remain in an installation position without the use of fasteners or other external restraint.

19. The enclosure as claimed in claim 18, wherein said first flange shape and said second flange shape are dissimilar.

20. The enclosure as claimed in claim 19, wherein said first flange is formed as a ninety degree bend along a first edge of said trim plates.

21. The enclosure as claimed in claim 20, wherein said second flange is formed as a U-shape along a second edge of said trim plates.

22. The enclosure as claimed in claim 21, wherein said ninety degree bend faces outward.

23. The enclosure as claimed in claim 22, wherein said U-shape faces inward.

24. The enclosure as claimed in claim 23, wherein said trim plates can be removed as a single piece.

25. The enclosure as claimed in claim 24, wherein said trim plates are attached to a cover collector.

26. The enclosure as claimed in claim 25, wherein said electrical enclosure is an electrical panelboard.

27. The electrical panelboard as claimed in claim 26, wherein said electrical panelboard is a switchboard.

28. The electrical panelboard as claimed in claim 27, wherein said electrical panelboard is a power panel.

29. A method of gap-free trim plate installation, the steps comprising:

providing an electrical panelboard front;

providing a plurality of trim plates, each trim plate with an interlocking flange at one end and an opposite end, at least one of said interlocking flange at said one end and a said opposite end extending a length of said trim plate;

configuring said one end of said trim plate to freely pivot about said opposite end of said trim plate for removal and installation of said trim plate disposed between a first adjacent trim plate and a second adjacent trim plate;

securing a first trim plate to said panelboard front;

interlocking a first flange of a second trim plate with a second flange of said first trim plate;

releasing said second trim plate; and installing trim plate mounting fasteners.

30. The method of claim 29, wherein said first flange is formed as a ninety degree bend along a first edge of said trim plates.

31. The method of claim 30, wherein said second flange is formed as a U-shape along a second edge of said trim plates.

32. The method of claim 31, wherein said ninety degree bend faces outward.

33. The method of claim 32, wherein said U-shape faces inward.

34. An enclosure for telecommunications or computer equipment providing a gap-free cover plate installation, comprising:

an enclosure body; and a plurality of cooperatively engaged cover plates, wherein each cover plate of said plurality of cover plates includes;

a substantially planar center panel, a first flange having a first flange shape configured to cooperatively engage a second flange of a first adjacent cover plate, and a second flange having a second flange shape configured to cooperatively engage a first flange of a second adjacent cover plate, at least one of said first flange and said second flange extends a length defining a length of said center panel, one end of said cover plate is free to pivot about an opposite end of said cover plate for removal and installation of said cover plate disposed between said first and second adjacent cover plates.

35. The enclosure as described in claim 34, wherein said first flange shape and second flange shape interlock said cover plates with one another when installed in said enclosure.

36. The enclosure as claimed in claim 35, wherein said first flange shape and said second flange shape allow said cover plates to be hingedly coupled with one another.

37. The enclosure as claimed in claim 36, wherein a cooperative engagement of said first flange and said second flange allows said cover plates to remain in an installation position without the use of fasteners or other external restraint.

38. The enclosure as claimed in claim 37, wherein said first flange shape and said second flange shape are dissimilar.

39. The enclosure as claimed in claim 38, wherein said first flange is formed as a ninety degree bend along a first edge of said cover plates.

40. The enclosure as claimed in claim 39, wherein said second flange is formed as a U-shape along a second edge of said cover plates.

41. The enclosure as claimed in claim 40, wherein said ninety degree bend faces outward.

42. The enclosure as claimed in claim 41, wherein said U-shape faces inward.

43. The enclosure as claimed in claim 42, wherein said cover plates can be removed as a single piece.

44. The enclosure as claimed in claim 43, wherein said cooperatively engaged cover plates overlap adjacent cover plates.

* * * * *